UNITED STATES PATENT OFFICE.

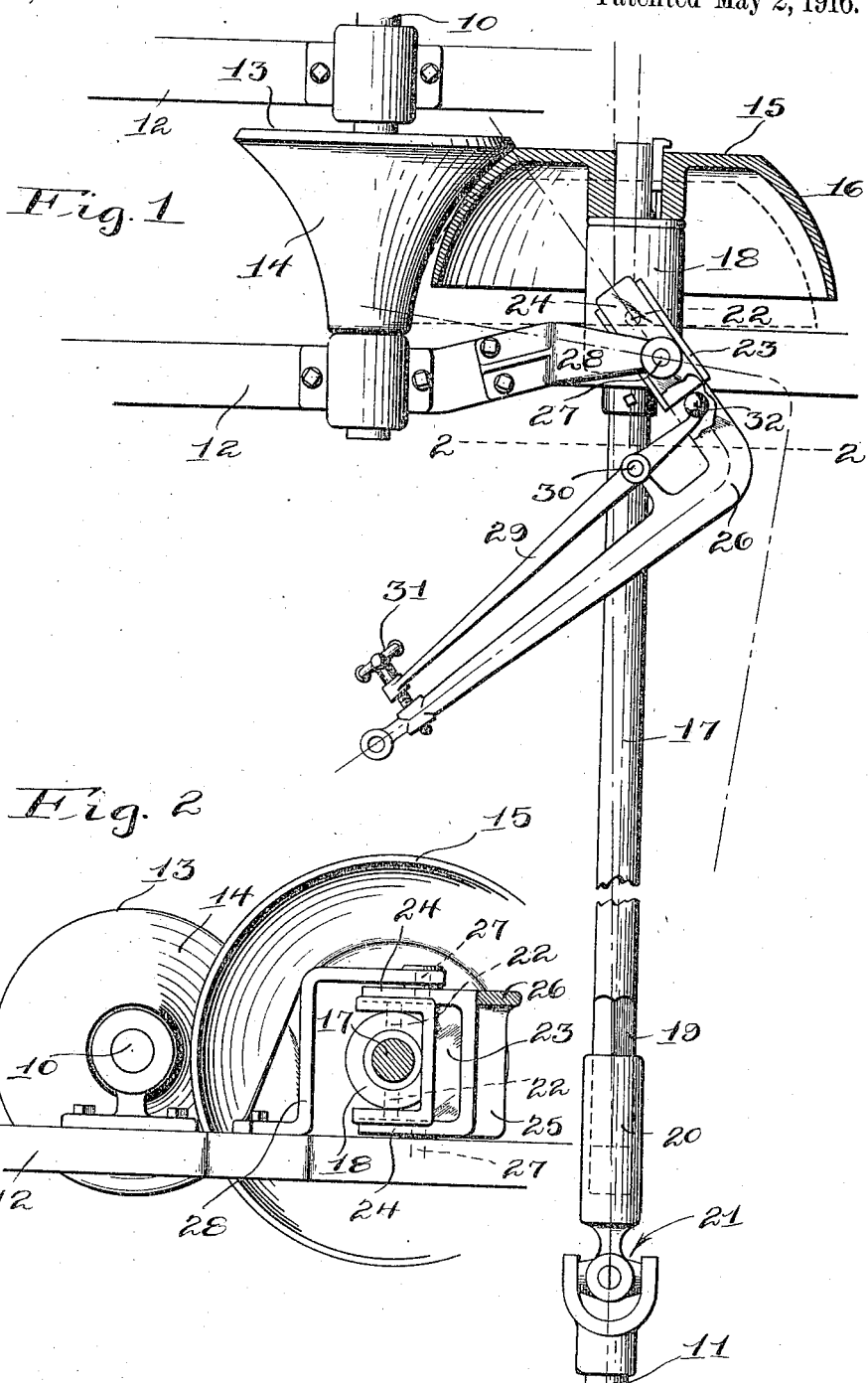

FREDERICK W. FULLERTON, OF ST. PAUL, MINNESOTA.

POWER-TRANSMITTING DEVICE.

1,181,218.  Specification of Letters Patent.  Patented May 2, 1916.

Application filed April 10, 1914. Serial No. 830,929.

*To all whom it may concern:*

Be it known that I, FREDERICK W. FULLERTON, a citizen of the United States, residing at St. Paul, in the county of Ramsey and State of Minnesota, have invented new and useful Improvements in Power-Transmitting Devices, of which the following is a specification.

My invention relates to improvements in power transmitting devices. Its object is to provide a variable speed frictional transmission designed particularly, though not exclusively, for use in small self-propelled vehicles where it is desirable to have light, inexpensive, compact and efficient power transmitting devices.

In most devices of this class, it is necessary to shift one or the other or both of the frictionally engaged wheels or drums a considerable distance in order to move the point of contact between the members an equal distance, and in other cases, it is necessary to change substantially the angular relation of the axes of the friction members, thus resulting in the inefficient practice of transmitting power through angles of greater or less degree.

It is particularly my object to improve upon transmissions of this kind by providing a driving and a driven member and actuating devices therefor designed to require only a slight change in the relative position to secure all variations in speed within the range of said transmission.

In the drawings, Figure 1 is a plan view of a device embodying my invention, and Fig. 2 is a detail sectional view taken on the line 2—2 of Fig. 1.

Referring to the accompanying drawings, I have used the reference numerals 10 and 11 to indicate respectively the driving and driven shafts, which are revolubly fixed upon the frame 12 and operatively connected through my improved transmission device. The bell-shaped driving drum 13 is fixed upon the shaft 10 and is formed with a concave frictional surface 14. The driven drum 15 has a convex frictional surface 16 and is keyed upon the floating power shaft 17. This shaft 17 is journaled near one end in the movable bearing 18 and the angular portion 19 at the opposite end of said shaft is slidably mounted in the sleeve 20 on the universal joint 21, said joint being employed to flexibly connect the power shaft 17 with the driven shaft 11. The bearing 18 carries said floating shaft and moves the same to frictionally engage said drums 13 and 15 in varying positions and also to disengage said drums. Said bearing is pivoted upon trunnions 22 within the saddle 23, which is slidable between the arms 24 of the fork 25. This fork is provided with a shifting lever 26 and is formed with a pair of trunnions 27, one trunnion being pivoted in the frame and the other in the bracket 28 on the frame. Said trunnions 22 and 27 are perpendicular to a plane through the axis of the driving drum and the points at which the axes of said trunnions intersect said plane are respectively centers of the longitudinal arcs of contact of the drums 15 and 13. Said centers are closely adjacent, the center of longitudinal curvature of the convex drum being within the radius of similar curvature of the other drum which extends to the point of contact between said drums. The longitudinal arcs of contact are, therefore, but slightly divergent from the point of engagement between the drums and it will be seen that only a very limited longitudinal and angular movement of the floating shaft is required to shift the point of engagement throughout the entire length of said arcs of contact.

It will be noted that the lower portions of the frictional surfaces of the drums 15 and 13 (as illustrated) are substantially parallel with the axes of the shafts 10 and 17 and that a rolling motion between said drums results when power is transmitted at a low speed from the drum 13 to the drum 15.

I have provided means to prevent slipping between the drums 13 and 15 which may be adjusted to suit different conditions. The resilient arm 29, pivoted at 30 on the lever 26, is furnished at one end with a hand screw 31 threaded in said lever and is supplied at its other end with a ball bearing 32. Said bearing impinges against the back of the slidable saddle 23, and, (according to the adjustment of said screw 31), exerts more or less force against said saddle to increase or diminish the pressure of the driven drum 15 against the driving drum 13.

When the driven drum is in the position shown in solid lines in Fig. 1, the diameters of the driving and driven drums at their point of contact are about the same, which ratio results in the rotation of said drums, at substantially equal speeds. By moving the lever 26 toward the position indicated by the dotted line, the point of contact is changed and through such point the diameter of the driving drum is less than the diameter of the driven drum; as a result, the speed of the driven drum is reduced. Continued movement of the lever 26 toward said dotted position gradually decreases the speed of said driven member and when said lever passes beyond said dotted line, the frictional surfaces of said drums are disengaged and the connection between the driving and driven shafts is broken. Movement of the lever toward its original position reengages the frictional surfaces of the drums 15 and 13 and progressively increases the speed of the driven drum relative to that of the driving drum. Manipulation of the hand screw 31 increases or diminishes pressure between the drums 13 and 15, as desired.

Having described my invention, what I claim as new and desire to protect by Letters Patent, is:

1. In a variable speed transmission, a frame, a friction driving drum, concave in axial section and revolubly fixed upon the frame, a lever pivoted upon said frame, a frictionally driven drum, convex in axial section and pivotally and revolubly mounted upon said lever, the curvature of the driven drum being slightly greater than that of the driving drum, said driven drum being so arranged on said lever that, in tilting, said drum constantly engages the driving drum, and said lever being so located upon the frame as to swing the driven drum in an arc which will at all times cause engagement between portions of the friction surfaces of said drums.

2. In a variable speed transmission, a frame, a driving drum revolubly fixed upon the frame and having a longitudinally concave friction surface, a movable driven drum formed with a longitudinally convex friction surface adapted to engage said driving drum, the axes of said drums lying in the same plane, a shifting lever, a pivot furnishing a mounting for said lever upon the frame, the axis of said pivot being at right angles to the plane through said shafts and intersecting said plane at the center of the adjacent arc of intersection between said concave friction surface and plane, and a second pivot furnishing a mounting for the driven drum upon said lever, the axis of said pivot being also at right angles to said plane and intersecting the same at the center of the arc of intersection between said convex friction surface and plane.

3. In a variable speed transmission, driving and driven drums frictionally engaged, said drums being curved longitudinally to provide in the former a concave frictional surface and in the latter a convex frictional surface, a frame upon which said driving drum is revolubly mounted, an oscillatory lever on the frame, a saddle slidable upon said lever, said saddle forming a pivotal mounting for said driven drum, a resilient arm pivoted on said lever, one end thereof being adapted to bear against said saddle and yieldingly press the driven drum against the driving drum and a hand screw, threaded in said lever and arranged to co-act with the other end of said arm to increase and diminish the pressure of the same upon the saddle.

4. In a variable speed frictional transmission device, a driving and a driven drum, the generatrices of the frictional surfaces of said drums being formed by arcs curved in opposite directions from their respective axes, the curvature of the frictional surface of the driving drum being slightly less in degree than that of the driven drum and a swinging fork supporting the driven drum in engagement with the driving drum and adapted to shift the point of contact between said drums.

5. In a variable speed transmission, a frame, a driving shaft revolubly fixed on said frame, a driving drum on said shaft having a longitudinally concave frictional surface, a floating shaft, a convex driven drum on said shaft adapted to engage said driving drum, an oscillatory member pivotally supporting the floating shaft at the center of longitudinal curvature of the driven drum and adapted to shift said driven drum in a path conforming with the longitudinal curvature of the driving drum.

6. In a variable speed transmission, a frame, a pair of frictionally engaged drums revolubly supported upon said frame, the surfaces of said drums being curved longitudinally to form arcs of engagement having unequal radii, the shorter radius to any given point of contact being coincident with the longer one, and means for moving one drum to change the point of contact between said drums.

7. In a variable speed transmission, a frame, a pair of frictionally engaged drums revolubly supported upon said frame, the surfaces of the drums being curved longitudinally to form arcs of engagement, said arcs of engagement having their subtending chords at acute angles with the axes of said drums and also having radii unequal in length, the shorter radius to a given point of contact being coincident with the longer one, and means for moving one drum with respect to the other to change the contact between said drums and disengage the same.

In testimony whereof, I have signed my name to this specification in the presence of two subscribing witnesses.

FREDERICK W. FULLERTON.

Witnesses:
F. M. HARDY,
F. C. CASWELL.

Copies of this patent may be obtained for five cents each, by addressing the "Commissioner of Patents, Washington, D. C."